United States Patent
Hu et al.

(10) Patent No.: US 10,626,332 B2
(45) Date of Patent: Apr. 21, 2020

(54) LABORATORY PROCESS FOR DEACTIVATION OF A POROUS SOLID

(71) Applicant: W. R. Grace & Co.-Conn., Columbia, MD (US)

(72) Inventors: Ruizhong Hu, Cooksville, MD (US); Gordon Dean Weatherbee, Sykesville, MD (US); Dariusz Orlicki, Columbia, MD (US); Michael Berg, Kennett Square, MD (US)

(73) Assignee: W.R. GRACE & CO.- CONN, Columbia, MD (US)

( * ) Notice: Subject to any disclaimer, the term of this patent is extended or adjusted under 35 U.S.C. 154(b) by 240 days.

(21) Appl. No.: 15/754,080

(22) PCT Filed: Aug. 18, 2016

(86) PCT No.: PCT/US2016/047507
§ 371 (c)(1),
(2) Date: Feb. 21, 2018

(87) PCT Pub. No.: WO2017/034914
PCT Pub. Date: Mar. 2, 2017

(65) Prior Publication Data
US 2018/0251686 A1 Sep. 6, 2018

Related U.S. Application Data

(60) Provisional application No. 62/208,095, filed on Aug. 21, 2015.

(51) Int. Cl.
*B01J 29/90* (2006.01)
*B01J 35/02* (2006.01)
*G01N 31/10* (2006.01)
*B01J 29/14* (2006.01)
*B01J 29/16* (2006.01)
*B01J 35/10* (2006.01)
*B01J 29/08* (2006.01)
*C10G 11/18* (2006.01)

(52) U.S. Cl.
CPC ............ *C10G 11/18* (2013.01); *B01J 29/084* (2013.01); *B01J 29/146* (2013.01); *B01J 29/166* (2013.01); *B01J 29/90* (2013.01); *B01J 35/023* (2013.01); *B01J 35/1014* (2013.01); *B01J 35/1019* (2013.01); *B01J 35/1038* (2013.01); *B01J 35/1042* (2013.01); *G01N 31/10* (2013.01); *B01J 2229/42* (2013.01)

(58) Field of Classification Search
CPC .... B01J 2229/42; B01J 29/084; B01J 29/146; B01J 29/166; B01J 29/90; B01J 35/023; B01J 35/1014; B01J 35/1019; B01J 35/1038; B01J 35/1042; C10G 11/18; G01N 31/10
See application file for complete search history.

(56) References Cited

U.S. PATENT DOCUMENTS

| | | | |
|---|---|---|---|
| 3,391,088 A | 7/1968 | Plank et al. | |
| 3,407,148 A | 10/1968 | Eastwood et al. | |
| 3,791,964 A | 2/1974 | Kuehl | |
| 3,816,342 A | 6/1974 | Plank et al. | |
| 6,419,890 B1 | 7/2002 | Li | |
| 6,627,445 B1 | 9/2003 | Akporiaye et al. | |
| 6,916,762 B2 | 7/2005 | Shibuya et al. | |
| 7,445,936 B2 | 11/2008 | O'Connor et al. | |
| 7,749,762 B2 | 7/2010 | Stockwell | |
| 2005/0145542 A1 | 7/2005 | O'Connor et al. | |
| 2007/0166826 A1* | 7/2007 | Stockwell | C10G 11/182 436/37 |
| 2013/0023710 A1 | 1/2013 | Ravichandran et al. | |

FOREIGN PATENT DOCUMENTS

| | | |
|---|---|---|
| EP | 1 046 423 B1 | 7/2007 |
| EP | 2 548 644 A1 | 1/2013 |
| EP | 1 960 089 B1 | 10/2013 |
| FR | 1553622 A | 1/1969 |
| GB | 1168226 A | 10/1969 |
| WO | 2005/021137 A1 | 3/2005 |
| WO | 2007/064991 A2 | 6/2007 |
| WO | 2013/011517 A1 | 1/2013 |

OTHER PUBLICATIONS

Gerritsen, L. A. et al., "Cyclic Deactivation: A Novel Technique to Simulate the Deactivation of FCC Catalyst in Commercial Units", Catalysis Today, No. 11,1991, pp. 61-72. (Year: 1991).*
Bryden, Kenneth, "Predict FCCU Performance with Laboratory Testing: Proper Simulation of Ecat and Reaction Conditions are Critical for Modeling of Future FCC Operations", Grace Catalysts Technologies(2012).
Chiranjeevi, T. et al., "Development of New Deactivation Method for Simulation of Fluid Catalytic Cracking Equilibrium Catalyst" Journal of Chemical Sciences, vol. 126, No. 2, Mar. 2014, pp. 353-360.
Diaz, Eva et al., "Adsorption Characterisation of Different Volatile Organic Compounds Over Alumina, Zeolites and Activated Carbon Using Inverse Gas Chromatography", Journal of Chromatography A, No. 1049, 2004, pp. 139-146.
Diaz, Eva, "Comparative Study on the Gas-Phase Adsorption of Hexane Over Zeolites by Calorimetry and Inverse Gas Chromatography", Journal of Chromatography A, No. 1095, 2005, pp. 131-137.
Gerritsen, L. A. et al., "Cyclic Deactivation: A Novel Technique to Simulate the Deactivation of FCC Catalyst in Commercial Units", Catalysis Today, No. 11, 1991, pp. 61-72.

(Continued)

*Primary Examiner* — Jennifer Wecker
(74) *Attorney, Agent, or Firm* — Charles A. Cross; Beverly J. Artale

(57) ABSTRACT

A process for the laboratory deactivation of a porous solid comprising subjecting the porous solid to a cyclic treatment, the treatment being selected from a hydration/dehydration cyclic treatment, a thermal cyclic treatment, or combinations thereof.

42 Claims, No Drawings

(56) References Cited

OTHER PUBLICATIONS

Melin, Michel et al., "The Importance of Using Pilot Plant Testing for FCC Catalyst Selection", Grace Catalysts Technologies, Jun. 2013, pp. 1-5.
Nguyen, Thu H. et al., "Effect of Hydrothermal Conditions on the Catalytic Deactivation of a Fluid Cracking Catalyst", Reaction Kinetics, Mechanisms and Catalysis, No. 109, 2013, pp. 563-574.
Psarras, A. C et al., "Advances in Fluid Catalytic Cracking: Testing, Characterization, and Environmental Regulations", Chemical Industries, 2010, 32 pages.
Psarras, A. C.et al., "Investigation of Advanced Laboratory Deactivation Techniques of FCC Catalysts via FTIR Acidity Studies", Microporous and Mesoporous Materials, No. 120, 2009, pp. 141-146.
Psarras, A. C. et al., "Study of the Accessibility Effect on the Irreversible Deactivation of FCC Catalysts from Contaminant Feed Metals", Catalysis Today, No. 127, 2007, pp. 44-53.
Schuurman, Y et al., "Effect of Coke Deposition on Transport and Sorption in FCC Catalysts Studied by Temporal Analysis of Products", Chemical Engineering Science, No. 60, 2005, pp. 1007-1017.
Schuurman, Y. et al., "The TAP-2 Reactor as an Alternative Tool for Investigating FCC Catalysts", Chemical Engineering Science, No. 54, 1999, pp. 3619-3625.
Wallenstein, D. et al., "Progress in the Deactivation of Metals Contaminated FCC Catalysts by a Novel Catalyst Metallation Method", Applied Catalysis A: General, No. 462-463, 2013, pp. 91-99.
Wallenstein, D.et al., "Recent Advances in the Deactivation of FCC Catalysts by Cyclic Propylene Steaming (CPS) in the Presence and Absence of Contaminant Metals" Applied Catalysis A: General, No. 204, pp. 89-106.
Wallenstein, D. et al., "Review on the Deactivation of FCC Catalysts by Cyclic Propylene Steaming", Catalysis Today, No. 127, 2007, pp. 54-69.
Xie, Jinhai et al., "Inverse Gas Chromatography Studies of Alkali Cation Exchanged X-Zeolites", Journal of Molecular Catalysis A: Chemical, No. 135, 1998, pp. 187-197.

* cited by examiner

LABORATORY PROCESS FOR DEACTIVATION OF A POROUS SOLID

FIELD OF THE INVENTION

The invention relates to a laboratory deactivation process for porous solids. More particularly, the invention relates to a laboratory deactivation process for FCC catalyst using cyclic treatments of hydration/dehydration or heating/cooling.

BACKGROUND OF THE INVENTION

Fluidized catalytic cracking ("FCC") is a key process in modern petrochemical refineries due to the large volume of gasoline and distillate fuels that it generates. An integral part of FCC operation is the catalyst, which is particularly designed in view of a unit's product needs, feedstock and operating limitations. The health of the FCC catalyst is typically monitored by taking samples of the circulating catalyst (the so-called equilibrium catalyst) and performing tests to measure physical/chemical properties and the activity of the catalyst under standard laboratory testing. However, the properties of the equilibrium catalyst ("ECAT") also provides a measure of the deactivation characteristics of a particular FCC unit, which is a complex product of hydrothermal conditions, catalyst additions, inherent catalyst activity and stability, and catalyst metals levels. Understanding a unit's deactivation characteristics, however, is a key consideration when a refiner undertakes changing its FCC catalyst, since it is customary for catalyst manufacturers to test new catalyst candidates by deactivating the candidates under conditions that proximate those of the unit ECAT. The closer that a laboratory unit deactivation protocol is to the actual unit, the more confidence can be given to test results that compare new catalysts to the incumbent catalyst.

When conducting a catalyst study, it is customary to obtain a sample of the unit feedstock and ECAT. Often fresh catalyst samples of the current catalyst are also available. The fresh catalyst is metallated and deactivated under laboratory conditions to duplicate the catalyst deactivation in the unit. In particular, the catalyst manufacturer attempts to duplicate the ECAT total surface area, zeolite surface area, matrix surface area and unit cell size with the deactivation protocol used in an accelerated manner relative to unit deactivation. Those conditions are then used to deactivate the proposed catalysts, and catalyst performance testing is conducted on the deactivated catalysts with the unit feedstock.

Early deactivation methods did not utilize metals at all, or deactivated the metals in a way that overemphasized their dehydrogenation effects. This was not as serious a concern to units that operated at low metals levels, and in those cases the total surface area, and especially zeolite surface area would be targeted to more closely match the unit ECAT. However, for higher metals operation it was clearly inadequate. Much work has been done to improve deactivation methods. For example, studies have been performed in the area of cyclic propylene steaming, e.g., Wallenstein et al., *Recent advances in the deactivation of FCC catalysts by cyclic propylene steaming (CPS) in the presence and absence of contaminant metals*, Applied Catalysis A: General 204 (2000) 89-106, Wallenstein et al., *Review on the deactivation of FCC catalysts by cyclic propylene steaming*, Catalysis Today 127 (2007), 54-69, Psarras et al., *Investigation of advanced laboratory deactivation techniques of FCC catalyst via FTIR acidity studies*, Microporous and Mesoporous Materials 120 (2009) 141-146, Nguyen et al., *Effect of hydrothermal conditions on the catalytic deactivation of a fluid cracking catalyst*, Reac. Kinet Mech. Cat. (2013) 109:563-564, and Psarras et al., *Advanced Artificial Deactivation of FCC Catalysts*, from Chemical Industries (Boca Raton, Fla.) (2010), 129 (Advances in Fluid Catalytic Cracking), 127-141. However, despite the development of protocols that better simulate metals effects and match zeolite surface areas, the ability to adequately reproduce matrix surface area, in particular to simultaneously match zeolite and matrix surface area, has remained elusive, since the severity required in conventional protocols to match matrix surface areas will normally reduce the zeolite surface area to undesirable levels.

The need to deactivate FCC catalysts in such a way as to match matrix surface area has thus existed for many years, however, as the advance of higher matrix catalysts has accompanied the rise in importance of bottoms upgrading and maximum LCO operation, the need to adequately match all catalyst properties has also grown. There is thus an ongoing need for improved catalyst deactivation protocols, and in particular, a need for catalyst deactivation protocols that can independently adjust matrix surface areas in porous solids relative to zeolite surface area in such a way that both the zeolite surface area and matrix surface area of a commercial ECAT can be duplicated from laboratory deactivation methods. Applicants have unexpectedly discovered methods of achieving such a laboratory deactivation using cyclic deactivation methods.

SUMMARY OF THE INVENTION

The subject matter of the present disclosure relates to a laboratory process for deactivating catalysts using cyclic techniques.

In one embodiment, the present disclosure provides a process for the laboratory deactivation of a porous solid comprising subjecting the porous solid to a cyclic treatment, the treatment being selected from a hydration/dehydration cyclic treatment, a thermal cyclic treatment, or combinations thereof. The hydration/dehydration cyclic treatment comprises at least five cycles of: (i) contacting in a hydration step the porous solid with a hydrating gas stream comprising water at a relative humidity of 20 to 100% and a temperature of 50° F. to 400° F., thereby forming a hydrated solid; and (ii) contacting in a dehydration step the hydrated solid with a dehydrating gas stream comprising water at a relative humidity of less than 20% and a temperature of from 200° F. to 1600° F., thereby forming a dehydrated solid, where for each cycle, except the first cycle, the dehydrated solid is the porous solid for the hydration step in the next cycle. The thermal cyclic treatment comprises at least five cycles of: (i) heating the porous solid to a heated temperature of 900° F. to 1575° F., thereby forming a heated porous solid; and (ii) cooling the heated porous solid to a cooled temperature, thereby forming a cooled porous solid, where the difference between the heated temperature and the cooled temperature is at least 200° F., and where for each cycle, except the first cycle, the cooled porous solid is the porous solid for the heating step in the next cycle.

In another embodiment, the present disclosure provides a process comprising first treating a porous solid in a hydrothermal or redox deactivation process, thereby forming a deactivated porous solid. Then, the deactivated porous solid is subjected to a cyclic treatment, the cyclic treatment being selected from a hydration/dehydration cyclic treatment, a thermal cyclic treatment, or combinations thereof. The hydration/dehydration cyclic treatment comprises at least five cycles of: (i) contacting in a hydration step the porous solid with a hydrating gas stream comprising water at a relative humidity of 20 to 100% and a temperature of 50° F. to 400° F., thereby forming a hydrated solid; and (ii) contacting in a dehydration step the hydrated solid with a dehydrating gas stream comprising water at a relative humidity of less than 20% and a temperature of from 200° F. to 1600° F., thereby forming a dehydrated solid, where for each cycle, except the first cycle, the dehydrated solid is the deactivated porous solid for the hydration step in the next cycle. The thermal cyclic treatment comprises at least five cycles of: (i) heating the porous solid to a heated temperature of 900° F. to 1575° F., thereby forming a heated porous solid; and (ii) cooling the heated porous solid to a cooled temperature, thereby forming a cooled porous solid, where the difference between the heated temperature and the cooled temperature is at least 200° F., and where for each cycle, except the first cycle, the cooled porous solid is the deactivated porous solid for the heating step in the next cycle.

In another embodiment, the present disclosure provides a process for the laboratory deactivation of a porous solid comprising subjecting the porous solid to a cyclic treatment, the cyclic treatment being selected from a hydration/dehydration cyclic treatment, a thermal cyclic treatment, or combinations thereof, thereby forming a deactivated porous solid. The hydration/dehydration cyclic treatment comprises at least five cycles of: (i) contacting in a hydration step the porous solid with a hydrating gas stream comprising water at a relative humidity of 20 to 100% and a temperature of 50° F. to 400° F., thereby forming a hydrated solid; and (ii) contacting in a dehydration step the hydrated solid with a dehydrating gas stream comprising water at a relative humidity of less than 20% and a temperature of from 200° F. to 1600° F., thereby forming a dehydrated solid, where for each cycle, except the first cycle, the dehydrated solid is the porous solid for the hydration step in the next cycle. The thermal cyclic treatment comprises at least five cycles of: (i) heating the porous solid to a heated temperature of 900° F. to 1575° F., thereby forming a heated porous solid; and (ii) cooling the heated porous solid to a cooled temperature, thereby forming a cooled porous solid, where the difference between the heated temperature and the cooled temperature is at least 200° F., and where for each cycle, except the first cycle, the cooled porous solid is the porous solid for the heating step in the next cycle. Next, the deactivated porous solid is treated in a hydrothermal or redox deactivation process, thereby forming a deactivated porous solid.

In still another embodiment, the present disclosure provides a method for deactivating an FCC catalyst having a matrix surface area, to simulate a target matrix surface area. First, the FCC catalyst solid is treated in a hydrothermal or redox deactivation process, thereby forming a deactivated FCC catalyst. Then the deactivated FCC catalyst is subjected to a cyclic treatment, thereby forming a cyclically-treated catalyst having a matrix surface area, the cyclic treatment being selected from a hydration/dehydration cyclic treatment, a thermal cyclic treatment, or combinations thereof. The hydration/dehydration cyclic treatment comprises at least five cycles of: (i) contacting in a hydration step the porous solid with a hydrating gas stream comprising water at a relative humidity of 20 to 100% and a temperature of 50° F. to 400° F., thereby forming a hydrated solid; and (ii) contacting in a dehydration step the hydrated solid with a dehydrating gas stream comprising water at a relative humidity of less than 20% and a temperature of from 200° F. to 1600° F., thereby forming a dehydrated solid, where for each cycle, except the first cycle, the dehydrated solid is the porous solid for the hydration step in the next cycle. The thermal cyclic treatment comprises at least five cycles of: (i) heating the porous solid to a heated temperature of 900° F. to 1575° F., thereby forming a heated porous solid; and (ii) cooling the heated porous solid to a cooled temperature, thereby forming a cooled porous solid, where the difference between the heated temperature and the cooled temperature is at least 200° F., and where for each cycle, except the first cycle, the cooled porous solid is the porous solid for the heating step in the next cycle. Then, the matrix surface area of the cyclically-treated catalyst is compared to the target matrix surface area. Finally, the number of cycles of the previous step is changed to adjust the matrix surface area of the cyclically-treated catalyst.

In another alternate embodiment, the present disclosure provides a method for deactivating an FCC catalyst having a matrix surface area, to simulate a target matrix surface area. First, the FCC catalyst is subjected to a cyclic treatment, the cyclic treatment being selected from a hydration/dehydration cyclic treatment, a thermal cyclic treatment, or combinations thereof. The hydration/dehydration cyclic treatment comprises at least five cycles of: (i) contacting in a hydration step the FCC catalyst with a hydrating gas stream comprising water at a relative humidity of 20 to 100% and a temperature of 50° F. to 400° F., thereby forming a hydrated solid; and (ii) contacting in a dehydration step the hydrated solid with a dehydrating gas stream comprising water at a relative humidity of less than 20% and a temperature of from 200° F. to 1600° F., thereby forming a dehydrated solid, where for each cycle, except the first cycle, the dehydrated solid is the porous solid for the hydration step in the next cycle. The thermal cyclic treatment comprises at least five cycles of: (i) heating the FCC catalyst to a heated temperature of 900° F. to 1575° F., thereby forming a heated porous solid; and (ii) cooling the heated porous solid to a cooled temperature, thereby forming a cooled porous solid, where the difference between the heated temperature and the cooled temperature is at least 200° F., and where for each cycle, except the first cycle, the cooled porous solid is the porous solid for the heating step in the next cycle. Then, the cyclically-treated catalyst is treated in a hydrothermal or redox deactivation process, thereby forming a deactivated FCC catalyst. Next, the matrix surface area of the deactivated catalyst is compared to the target matrix surface area. Finally, the number of steps of the cyclic treatment is changed to adjust the matrix surface area of the cyclically-treated catalyst.

In another alternate embodiment, the present disclosure provides a method for comparing a series of FCC catalysts. A first FCC catalyst having a matrix surface area is deactivated to simulate a target matrix surface area using a combination of cyclic treatment (hydration/dehydration or cyclic heat treatment). Then an additional FCC catalyst is deactivated with the procedure used for the first FCC catalyst. Finally, at least one of the physical properties and yield performance of the first FCC catalyst and the at least one additional FCC catalyst are determined.

DETAILED DESCRIPTION OF THE INVENTION

The inventive process is a laboratory method for deactivating porous solids, particularly FCC catalysts, using cyclic techniques.

FCC Catalytic System

The FCC produces gasoline and distillate fuels as desired products by contacting hot, regenerated catalyst from the FCC regenerator with hydrocarbon feed in the FCC riser. The hydrocarbon feed vaporizes, depositing most metals present in the feed on the surface of the catalyst. The vaporized hydrocarbon feed reacts on the surface and in the pores of the catalyst to form smaller (cracked) molecules. During the reactions in the FCC riser, coke is formed and deposited on the active surface of the catalyst. The "coked" catalyst is separated from the product vapors, stripped with steam and then flows back to the regenerator. In the regenerator, the coke (carbon) deposited on the catalyst surface is burned to levels below 0.5 wt %, preferably to levels below 0.1 wt %.

The activity of the FCC catalyst circulating in the unit inventory depends upon its initial activity, hydrothermal deactivation that occurs in the unit, poisoning by metals or other feed contaminants that deactivate the catalyst, and the fresh catalyst addition rate.

Porous Solid-FCC Catalyst

The porous solids used in the process of the present disclosure are fine powders of oxides of silicon and aluminium having a pore volume of 0.2 to 0.7 cm$^3$/g, surface area of 10 to 500 m$^2$/g, and an average particle size of 20 to 100 μm. Preferably, the porous solid is selected from FCC catalysts. More preferably, the porous solid is an FCC catalyst containing a zeolite, an active matrix, clay and a binder, the catalyst having an alumina content of 20 to 70% and a silicate content of 25 to 75%. FCC catalyst particles have on average a diameter of 50-110 μm, and contain approximately 20-60% zeolite crystals of about 1-2 μm average diameter dispersed in the matrix. The zeolite is the primary catalytic component for selective cracking reactions and is a synthetic faujasite crystalline material. It includes material that is manufactured in the sodium form (Standard-Y) by crystallization of sodium aluminate and sodium silicate, followed by washing; and ultrastable Y ("USY"), produced by increasing the silicon/aluminium atomic ratio of the parent standard-Y zeolite via a dealumination process. The resulting USY zeolite is much more stable to the hydrothermal deactivation in commercial FCC units than Standard Y zeolite. The zeolite crystal for USY zeolite has a fresh unit cell size of approximately 24.40-24.65 Å and a SiO$_2$/Al$_2$O$_3$ mole ratio of about 5.5. The zeolites can be treated with cations, typically rare earth mixtures, to remove sodium from the zeolite framework, which increases activity and further stabilizes the zeolite to deactivation in the FCC unit. The zeolite possesses pores in the 7.4-12 Å range, allowing only penetration of molecules smaller than 10.2 Å. After hydrothermal deactivation in the commercial FCC, the zeolite acquires pores in the 20 to 800 Å range. Such pores reside primarily in the so-called mesopore range (20 to 500 Å) range. Surface area corresponding to the zeolite, i.e., surface area corresponding to pores in the range of <20 Å, typically ranges from 20 to 500 m$^2$/g, preferably from 60 to 400 m$^2$/g.

The catalyst can also include active matrix. This is catalytically active, porous silica-alumina material, however, in contrast to the zeolite, it is non-crystalline, i.e., amorphous. The active matrix contains pores in the mesopore range (20-500 Å) as well as macropores (>500 Å). Surface area corresponding to the matrix, i.e., the surface of pores in the range of from 20 to 10000 Å typically ranges from 10 to 200 m$^2$/g, preferably from 90 to 150 m$^2$/g. Because of the molecular size restrictions for entering the zeolite pores, and thus for zeolite cracking, the presence of active matrix serves the important purpose of cracking molecules that are too large for diffusion into the zeolite pores. In the active matrix, these large molecules can be cracked into reaction products that are small enough to then navigate the zeolite pores for further coke selective cracking. Without the matrix, the large molecules would thermally condense to coke on the surface of the catalyst. In this way, it can be understood that the performance of an FCC catalyst is fundamentally dependent on its design in terms of a balance of zeolite and matrix components, particularly for use with heavier feedstocks. If matrix is not present in sufficient quantities, large molecules cannot diffuse into the zeolite pores to be cracked, and so form coke. If zeolite is not present in sufficient quantities, coke selective cracking cannot occur, so again coke is formed. The synergism between the zeolite and matrix lies in the relationship between their pore structures.

The catalyst also includes clay. While not generally contributing to the catalytic activity, clay provides mechanical strength and density to the overall catalyst particle to enhance its fluidization.

Finally, the catalyst contains a binder. This is the glue that holds the zeolite, matrix and clay together. The binders are typically silica-based, alumina-based or clay-based. The silica-based binders have very little or no activity. The alumina-based and clay-based binders have some bottoms cracking ability.

The complete FCC catalyst has a total water pore volume of 0.2 to 0.6 cm$^3$/g, where the water pore volume is determined by adding water to a dry sample of a given weight. The water in between the particles was removed by centrifugation. The water pore volume represents the volume of water that displaces the air in the pores.

During FCC operation, continuums of pore openings and pores of different sizes evolve in the catalyst, whereby the pores ascribed to the mesopores of the zeolite (20-500 Å) are enlarged with particle age, while matrix pores decrease.

Unit Deactivation of FCC Catalysts

Fresh catalyst injected into a commercial FCC unit is at the peak of its activity. Immediately after injection, as the catalyst cycles from the reducing, lower temperature environment of the reactor to the high-temperature, oxidative environment of the regenerator, the catalyst is hydrothermally deactivated. Such deactivation is illustrated principally by a reduction in the catalyst surface area and unit cell size. Periodically, the extent of hydrothermal deactivation can be worsened by general temperature excursions in the regenerator or by localized high temperature zones in the regenerator caused by, for example, the use of torch oil. However, absent singular events, the hydrothermal deactivation in an FCC unit is normally considered characteristic of a particular unit. In addition to the hydrothermal deactivation that occurs in the FCC unit, performance of the circulating FCC catalyst is affected as a result of feedstock metals being deposited on the surface of the catalyst. Typically, these metals include nickel, vanadium, iron, sodium or mixtures thereof. The level of nickel on the fluid cracking catalyst is from 0 to 20,000 ppm, preferably 500 to 8,000 ppm based on the weight of the fluid cracking catalyst. The level of vanadium on the fluid cracking catalyst typically is from 0 to 10,000, preferably 1000 to 8,000 ppm based on the weight of the fluid cracking catalyst.

Metals such as nickel catalyse dehydrogenation reactions, which result in gas and coke being produced. Vanadium catalyses dehydrogenation reactions to a certain extent, however, it also attacks the zeolite structure itself. Sodium and calcium also attack the zeolite, but in addition, interact with the silica/alumina structure to reduce active surface area.

Laboratory Deactivation Protocols

In light of the deactivation that occurs in an operating FCC unit, a key challenge facing refiners is the ability to duplicate the deactivation of its real-life catalyst in the laboratory, i.e., metallation and hydrothermal deactivation of the catalyst. This arises most often when an FCC unit looks to change its fresh FCC catalyst, where a decision having significant economic impact will be made that is heavily dependent on the adequacy of a laboratory deactivation procedure. As a result, over the years, much work has been done to refine such deactivation procedures. The goal of such work has been to develop laboratory techniques that are much accelerated over the residence time of a catalyst particle in a commercial FCC unit, but nonetheless result in catalyst properties that closely mimic those of commercial units. Conventional procedures include the so-called hydrothermal steaming methods and redox methods. The hydrothermal steaming methods involve steaming catalyst at temperatures of 1000° F. to 1600° F., preferably 1200° F. to 1500° F. at 100% steam for a duration of 1 to 24, preferably 3 to 5 hours, and can include metals or be metals-free. In particular, one well known hydrothermal deactivation process is the Mitchell Method (MM). It can be conducted with or without metals, but generally involves a metals deposition step, typically using nickel and vanadium naphthenates to deposit a desired level of both metals on the catalyst, followed by maintaining the metallated catalyst at an elevated temperature under a steam atmosphere for a period of time. Steam partial pressures can range up to about 1.0 atmosphere. Temperatures can vary, but typically are from 1200 to 1500° F. Deactivation times can also vary, but typically range from 4 to 24 hours. Typical combined times/temperatures for Mitchell Method deactivation procedures are 4 hours at 1400° F. to 1500° F. However, while hydrothermal steaming procedures, such as that of the Mitchell Method are useful for lowering the zeolite surface area of a catalyst to a corresponding "equilibrium catalyst" (actual catalyst sample pulled from the FCC inventory), it does not adequately duplicate the matrix surface area. Moreover, because the steam partial pressure used in the laboratory is higher than actual units, and the absence of cycling the atmospheric conditions (reducing/oxidation) as in an actual FCC unit, the Mitchell method overstates the activity of the metals on the catalyst. In fact, where the Mitchell Method is used, laboratories often impregnate the catalyst with only 20 to 30% of the metals on the corresponding equilibrium catalyst.

To better account for metals effects, redox methods have been developed where the catalyst is subjected to alternating oxidation-reduction cycles. The reduction cycles typically involve contacting the catalyst with a reducing environment such as hydrogen or propylene. The oxidation cycles similarly involve contacting the catalyst with air, oxygen-enriched air or oxygen. Temperatures during the redox cycles are preferably between 720 to 790° C. Exemplary of such redox methods is the cyclic propylene steaming (CPS) procedure. CPS consists of a catalyst calcination and metals impregnation steps followed by cyclic oxidation/reduction aging of the catalyst. During the oxidation cycle the metallated catalyst is contacted with a 50/50 steam/air mixture containing 2000 ppm $SO_2$, and during the reduction cycle, a blend of propylene and nitrogen is introduced that results in a total blend containing about 2.5 wt % propylene. Between the oxidation/reduction cycles, the catalyst is purged with steam and nitrogen. Approximately 20 hours is needed to prepare a metallated catalyst sample by the CPS procedure.

Redox deactivation methods, such as the CPS method, can simulate equilibrium catalyst zeolite surface area, does a better job than the MM to simulate metals activity, and can be performed in a reasonable amount of time. However, it also does not simulate the matrix surface areas of their equilibrium catalysts.

Metals Impregnation

When the laboratory deactivation methods include metallation of the catalyst, the metals are impregnated onto the catalyst by incipient wetness techniques, spray techniques, and the so-called "crack on" techniques. In the incipient wetness techniques, the active metal, e.g., a metal naphthenate, is dissolved in an appropriate solvent which is then contacted with the catalyst, so that the solution is deposited onto the catalyst via capillary action without forming a pool of liquid over the catalyst.

In spray impregnation a solution of the contaminant metals, such as vanadium and nickel are deposited by spraying onto the outer surface area of the FCC catalyst. In this technique, the nickel remains primarily on the surface of the catalyst under severe hydrothermal conditions while vanadium migrates into the bulk of the particles and from particle to particle as observed in actual equilibrium catalysts In the crack-on methods of metals deposition, samples of fresh catalyst are subjected to a sequence of: cracking an FCC type feedstock containing metals, e.g., in the form of nickel and vanadium naphthanates, over the catalyst; stripping the catalyst; and then regenerating the catalyst, where deposited carbon is burned off the catalyst in the presence of steam. This series of steps is repeated until the desired level of metals is achieved. Examples of such crack-on methods include W.R. Graces's Cyclic Metals Impregnation (CMI) and Albemarle's Cyclic Deactivation (CD). These methods can include only simple deposition of the metals, e.g., by alternating metals deposition and deactivation steps, or a two-step procedure which also incorporates a cyclic deactivation procedure. The CMI method includes an initial catalyst calcination step followed by a number of cycles that include reaction, stripping, and regeneration. Metals accumulate on the catalyst during each cycle as the catalyst is contacted with a feedstock in the reactor in a manner that better duplicates commercial metals deposition. The CD method can also include cyclic metals deposition similar to that of the CMI method or all metals can be deposited in a single impregnation followed by the cyclic redox treatment. Typically 12-24 hours is required to complete the crack-on procedure for each catalyst that involves just the metals deposition, while 30-40 hours is required for the procedure including the deactivation step.

The crack-on methods do an excellent job of duplicating the commercial effects of metals deposition, and can do a good job of duplicating equilibrium catalyst zeolite surface area when combined with a cyclic redox treatment. However, the times required can be lengthy, and in any event it does not duplicate equilibrium catalyst matrix surface areas.

Cyclic Deactivation Methods

Each of the deactivation protocols discussed above have advantages, however, they share the disadvantage of an inability to closely match equilibrium catalyst matrix surface area. This is an important consideration since, as discussed above, the matrix is typically where the vast majority of bottoms upgrading reactions take place. In recent years, there has been an increased interest in bottoms upgrading capability and LCO production, which normally requires higher matrix surface area catalysts.

It has unexpectedly been discovered that by cyclically treating the catalyst in a manner that causes the matrix pores to repeatedly expand and contract, the controlled reduction of the matrix surface area can be achieved, i.e., the cyclic deactivation methods of the current subject matter can reduce matrix surface area while minimizing effects on zeolite surface area, relative to conventional protocols. Thus, deactivation procedures can be developed where both the catalyst zeolite and matrix surface areas experienced in the plant can be duplicated in the laboratory. This can be accomplished using the cyclic deactivation methods by themselves, or in conjunction with the conventional hydrothermal and redox deactivations, along with metals impregnation procedures, as described above. When the cyclic deactivation methods are used in conjunction with the above hydrothermal and redox deactivation techniques, they can be used in any order, i.e., the cyclic deactivation methods can be conducted before or after the hydrothermal or redox deactivation procedures, or both before and after. Alternately, the hydrothermal or redox deactivation procedure can be conducted before or after the cyclic deactivation methods, or both before and after. For example, the deactivation procedure includes cyclic deactivation+(hydrothermal or redox); cyclic deactivation+(hydrothermal or redox)+cyclic deactivation; (hydrothermal or redox)+cyclic deactivation; (hydrothermal or redox)+cyclic deactivation+(hydrothermal or redox); and other like combinations.

Because the cyclic deactivation methods primarily affect (reduce) the matrix surface area, they can be used to duplicate a unit's matrix deactivation characteristics by increasing/decreasing the number of cycles or temperature to lower/increase the matrix surface area of deactivated catalyst. This can be used in conjunction with the hydrothermal or redox deactivation techniques and metals impregnation techniques described above, where the conditions are adjusted (number of cycles, temperature, time, sequencing of hydrothermal or redox deactivation and cyclic deactivation) to duplicate the unit zeolite surface area and unit cell size. Once the complete deactivation procedure has been set to match the existing unit performance, those conditions can then be used to deactivate potential replacement catalysts in preparation for catalyst performance testing. Preferably, the deactivation method is a hydrothermal or redox deactivation method such as MM or CPS, followed by a cyclic deactivation method, followed by a hydrothermal or redox deactivation. More preferably, the cyclic deactivation method is a hydration/dehydration cyclic treatment. In the deactivation method, for the hydrothermal or redox deactivation steps, the initial CPS or MM cyclic treatment includes at least 20, preferably at least 30 cycles, and the final CPS or MM treatment includes at least 3, preferably at least 6 cycles. The hydration/dehydration treatment includes at least 20, preferably at least 30 cycles.

Hydration/Dehydration Cyclic Treatment (CHS)

The hydration/dehydration cyclic treatment comprises contacting in a hydration step the porous solid with a hydrating gas stream comprising water at a relative humidity of 20 to 100%, preferably 35 to 90%, more preferably 50 to 80% and a temperature of 50° F. to 400° F., preferably, 60° F. to 230° F., more preferably from 100 to 225° F., and even more preferably from 180 to 220° F. For the purposes of this specification, the expression relative humidity is defined as: Relative Humidity=(water vapor partial pressure)/(water vapor saturation partial pressure at the actual dry bulb temperature)*100%.

The hydrated solid resulting from the hydration step is then contacted in a dehydration step with a dehydrating gas stream comprising water at a relative humidity of less than 20.0%, preferably 0 to 10.0%, more preferably, 0 to 5.0%, and even more preferably, 0 to 2.0%, and a temperature of 200° F. to 1600° F., preferably 500 to 1575° F., more preferably 800 to 1550° F., and even more preferably 950 to 1500° F., thereby forming a dehydrated solid. In each cycle after the first, the dehydrated solid is the porous solid for the hydration step in the next cycle.

The hydration and dehydration steps are independently conducted at a pressure of 14.1 psia to 150 psig, preferably from 14.2 psia to 28 psia, and more preferably from 14.4 psia to 15.0 psia.

In still another embodiment, the hydration and dehydration steps can be conducted in the same temperature range. When this is the case, the temperature range for both the hydration and dehydration steps is 180-220° F.

Preferably, the hydrating gas stream is selected from nitrogen, air, noble gases, water vapor or mixtures thereof. Preferably, the dehydrating gas stream is selected from nitrogen, air, noble gases, or mixtures thereof.

At least five hydration/dehydration cycles are utilized in the hydration/dehydration treatment step. Alternately, at least 10, at least 20 or at least 30 hydration/dehydration cycles are utilized in the hydration/dehydration treatment step. Typically, the duration of each hydration step and each dehydration step in a hydration/dehydration cycle is each from 1.0 minute to 12 hours, preferably 10 minutes to 6 hours, more preferably 15 minutes to 1 hour.

The vessel used for the hydration/dehydration step can be of any design consistent with the temperature and pressure requirements of the treatment step, which can physically hold the solid being treated, and facilitate contact of the solid and the hydration or dehydration gas; e.g., the vessel can be open to the atmosphere or closed, or it may be a portion of pipe or tubing, or a container of irregular size. The vessel will be equipped to route the hydrating and dehydrating gases to and from the vessel.

Thermal Cyclic Treatment

The thermal cyclic treatment comprises heating the porous solid to a heated temperature to form a heated porous solid. The heated temperature is typically 900° F. to 1575° F. Alternately, the heated temperature can be 950° F. to 1560° F., 975° F. to 1555° F., 1100° F. to 1550° F. or 1250° F. to 1525° F.

The heated porous solid is then cooled to form a cooled porous solid. The cooled temperature is typically 40° F. to 975° F. Alternately, the cooled temperature is 60° F. to 960° F. or 75° F. to 950° F.

The difference between the heated temperature and the cooled temperature is typically at least 200° F. This difference in temperature refers to the heated temperature and the immediately following cooled temperature. Alternately, the difference between the heated temperature and the cooled temperature is at least 400° F., or at least 450° F., or at least 500° F. For each cycle, except the first cycle, the cooled porous solid is the porous solid for the heating step in the next cycle The porous solid can be heated and cooled by any typically-used laboratory method, e.g., the vessel can be housed in an autoclave, or it can be jacketed to allow the flow of heating or cooling fluid around the vessel. Preferably, the porous solid is heated with a heating gas and cooled with a cooling gas, where the heating and cooling gases flow through the catalyst, and are independently selected from nitrogen, air, noble gases, steam, water vapor, or mixtures thereof. The heating and cooling gases can be the same or different. When the heating and cooling gases are different, they preferably have different oxygen concentrations. For example, the heating (or cooling) gas can have an oxygen concentration greater than 2 vol %, or alternately, greater than 10 vol % or greater than 20 vol %, while the corresponding cooling (or heating) gas has an oxygen concentration less than 1 vol %, or alternately, less than 9 vol % or less than 1 vol %, respectively.

When the porous solid is not heated and cooled with the flow of a heating or cooling gas, the atmosphere under which the solid is heated and cooled is selected from nitrogen, air, noble gases, steam, water vapor, or mixtures thereof, preferably, from nitrogen or air. The heating and cooling atmosphere can be the same or different. When the heating and cooling atmospheres are different, preferably they have different oxygen concentrations as described above. Preferably, the heating step is conducted in air. At least five heating/cooling cycles are utilized in the heating/cooling treatment step. Alternately, at least 10, at least 20 or at least 30 heating/cooling cycles are utilized in the heating/cooling treatment step. Typically, the duration of each heating step and each cooling step in a heating/cooling cycle is each from 1.0 minute to 12 hours, preferably 10 minutes to 6 hours, more preferably, 15 minutes to 2 hours.

The vessel used for the heating/cooling step can be of any design consistent with the temperature and pressure requirements of the treatment as described above.

The following Examples further detail and explain the performance of the inventive process to evaluate catalytic performance. Those skilled in the art will recognize many variations that are within the spirit of the invention and scope of the claims.

Unless modified in the following examples, the Test Procedures used in the examples are summarized below:
Surface Area: ASTM D3663-03(2015), is the Standard Test Method for Surface Area of Catalysts and Catalyst Carriers.
Unit Cell Size: ASTM D3942-03(2013), Standard Test Method for Determination of the Unit Cell Dimension of a Faujasite-Type Zeolite.
General CPS
  Heat-Up Phase
  Room temperature to 1006 K with 8.6 K/min; $N_2$ purge
  1006-1061 K with 1.1 K/min; $N_2$ purge
  29 cycles of the cycle described below at 1061 K
  10 min, 50% nitrogen+50% steam
  10 min, 50% $N_2$ (containing 5% propylene)+50% steam
  10 min, 50% nitrogen+50% steam
  10 min, 50%, 4000 ppm $SO_2$ in air+50% steam
  $30^{th}$ cycle
  10 min, 50% nitrogen+50% steam
  10 min, 50% $N_2$ (containing 5% propylene)+50% steam
  Cool down under nitrogen flow
ACE Testing: ASTM D7964/D7964M-14, Standard Test Method for Determining Activity of Fluid Catalytic Cracking (FCC) Catalysts in a Fluidized Bed.
Thermal Cycling Testing Examples 1-4 illustrate thermal cycling testwork. Example 1 demonstrates the effect on FCC catalyst of cycling from a low temperature to a temperature typical of FCC risers. Example 2 simulates the effect of cycling between the temperature of the riser and the regenerator. Example 3 illustrates the effect of rapid heating and cooling for the temperature cycling. Example 4 demonstrates burning of the hydrocarbon within the pores, as in catalyst processed in a commercial FCC regenerator.

Example 1

The FCC catalyst used for Example 1 is Midas-1, having a fresh total surface area of 270 $m^2/g$, a fresh zeolite surface area of 156 $m^2/g$, a fresh matrix surface area of 114 $m^2/g$, and a fresh unit cell size of 24.55 Å. The catalyst was subjected to repeated thermal cycles between room temperature and 950° F. under an air atmosphere, where the catalyst was held at the heated/cooled temperature for 30 minutes prior to the next cooling/heating step. Results of the repeated thermal cycles are summarized in Table 1.

TABLE 1

| | Cycle 1 | Cycle 2 | Cycle 3 | Cycle 4 | Cycle 5 | Cycle 6 | Cycle 7 | Cycle 8 | Cycle 9 | Cycle 10 |
|---|---|---|---|---|---|---|---|---|---|---|
| Surface Area, $m^2/g$: | 263 | 257 | 256 | 253 | 249 | 243 | 244 | 242 | 239 | 236 |
| ZSA, $m^2/g$: | 153 | 148 | 154 | 153 | 153 | 149 | 153 | 151 | 151 | 150 |
| MSA, $m^2/g$: | 110 | 109 | 102 | 100 | 96 | 94 | 91 | 91 | 88 | 86 |
| Z/M | 1.39 | 1.36 | 1.51 | 1.53 | 1.59 | 1.59 | 1.68 | 1.66 | 1.72 | 1.74 |
| Cell Size | 24.54 | 24.54 | 24.53 | 24.52 | 24.52 | 24.51 | 24.51 | 24.50 | 24.50 | 24.50 |

The results of Table 1 indicate that matrix surface area deactivated at a faster rate than zeolite surface area under repeated thermal cycles between room temperature and 950° F. Therefore, repeated thermal cycling, such as used in this example in combination with existing hydrothermal or CPS deactivation protocol can be used to simulate commercial ECAT and match zeolite surface area and matrix surface area simultaneously.

Example 2

The FCC catalyst used for Example 2 is as in Example 1. The catalyst was subjected to repeated thermal cycles between 950° F. under steam for 30 minutes followed by calcination under air at 1500° F. for 30 minutes. Results of the repeated thermal cycles are summarized in Table 2.

TABLE 2

|  | Cycle #1 | Cycle #2 | Cycle #3 | Cycle #4 | Cycle #5 | Cycle #6 | Cycle #7 | Cycle #8 | Cycle #9 |
|---|---|---|---|---|---|---|---|---|---|
| Surface Area, m$^2$/g: | 248 | 242 | 231 | 226 | 226 | 223 | 217 | 216 | 209 |
| ZSA, m$^2$/g: | 150 | 147 | 144 | 140 | 142 | 141 | 136 | 136 | 131 |
| MSA, m$^2$/g: | 98 | 95 | 87 | 87 | 84 | 82 | 81 | 79 | 78 |
| Unit Cell Size | 24.50 | 24.49 | 24.49 | 24.47 | 24.50 | 24.45 | 24.44 | 24.44 | 24.42 |

The results summarized in Table 2 demonstrate that matrix surface area deactivated at a faster rate than zeolite surface area under repeated thermal cycles between 950° F. for 30 minutes followed by calcination under air at 1500° F. for 30 minutes. Therefore, repeated thermal cycling, such as used in this example, in combination with existing hydrothermal or CPS deactivation protocol can be used to simulate commercial ECAT and simultaneously match zeolite surface area and matrix surface area.

Example 3

The FCC catalyst used for Example 3 was Midas-1 having a fresh total surface area of 276 m$^2$/g, a zeolite surface area of 152 m$^2$/g and a matrix surface area of 124 m$^2$/g. The catalyst was heated in a microwave oven until it reached a set-point temperature of 1500° F. The ramp-up time was 45 minutes. The sample was kept at the set point temperature for 5 minutes. After that the microwave was turned off and the sample was quenched with a mist of cold water until it reached room temperature. The procedure was repeated multiple times and sub-samples of catalyst were analyzed for physical properties. Results of the repeated rapid heating/cooling cycles are summarized in Table 3.

TABLE 3

|  |  | Fresh | 5 Cycles | 15 Cycles | 20 Cycles | 25 Cycles | 30 Cycles |
|---|---|---|---|---|---|---|---|
| Temperature |  | 1500° F. |  |  |  |  |  |
| Time |  | 0 | 5 | 15 | 20 | 25 | 30 |
| Surface area | m$^2$/g | 276 | 210 | 209 | 194 | 195 | 188 |
| Zeolite Surface Area | m$^2$/g | 152 | 128 | 132 | 125 | 127 | 123 |
| Matrix Surface Area | m$^2$/g | 124 | 82 | 76 | 69 | 69 | 65 |
| Average Pore Diameter | Angstroms | 51 | 63 | 66 | 68 | 68 | 70 |
| Micropore Volume | cc/g | 0.061 | 0.05 | 0.052 | 0.049 | 0.05 | 0.049 |
| Z/M |  |  | 1.23 | 1.56 | 1.74 | 1.81 | 1.84 | 1.89 |

The results of Table 3 indicate that exposing catalyst to periodic cycles of heating followed by rapid cooling preferentially densifies the matrix part of the catalyst particle, which can be measured by reduction of surface area. The increase in the ratio of surface area of zeolite to matrix with number of heating-cooling cycles is evidence of preferential matrix densification.

Example 4

The FCC catalyst used for Example 4 is as in Example 1. The catalyst sample was first calcined one hour at 1500° F. The sample was then cooled to room temperature and impregnated with 10 wt % FCC gas oil feed diluted by pentane. Then the sample was air-dried for 1 hour and heated up gradually to 1500° F. to simulate the effect of burn off of hydrocarbon on a catalyst. The procedure was repeated 20 times. The results are summarized in Table 4.

TABLE 4

|  | Cycle #1 | Cycle #2 | Cycle #3 | Cycle #4 | Cycle #5 | Cycle #6 | Cycle #7 | Cycle #8 | Cycle #9 | Cycle #10 | Cycle #11 |
|---|---|---|---|---|---|---|---|---|---|---|---|
| Surface Area, m$^2$/g: | 345 | 238 | 235 | 231 | 230 | 227 | 224 | 222 | 221 | 219 | 216 |
| ZSA, m$^2$/g: | 151 | 144 | 143 | 143 | 136 | 134 | 136 | 133 | 132 | 132 | 130 |

TABLE 4-continued

| | | | | | | | | | | | |
|---|---|---|---|---|---|---|---|---|---|---|---|
| MSA, m²/g: | 94 | 94 | 92 | 88 | 94 | 93 | 88 | 89 | 89 | 87 | 86 |
| Unit Cell Size | 24.51 | 24.49 | 24.48 | 24.47 | 24.46 | 24.46 | 24.45 | 24.44 | 24.44 | 24.43 | 24.43 |

| | Cycle #12 | Cycle #13 | Cycle #14 | Cycle #15 | Cycle #16 | Cycle #17 | Cycle #18 | Cycle #19 | Cycle #20 | Cycle #21 | Cycle #22 |
|---|---|---|---|---|---|---|---|---|---|---|---|
| Surface Area, m²/g: | 216 | 223 | 215 | 214 | 212 | 211 | 206 | 208 | 207 | 207 | 203 |
| ZSA, m²/g: | 129 | 137 | 130 | 130 | 131 | 129 | 127 | 129 | 132 | 131 | 126 |
| MSA, m²/g: | 87 | 86 | 85 | 84 | 81 | 82 | 79 | 79 | 75 | 76 | 77 |
| Unit Cell Size | 24.43 | 24.42 | 24.42 | 24.42 | 24.42 | 24.41 | 24.41 | 24.41 | 24.40 | 24.40 | 24.39 |

The results summarized in Table 4 demonstrate that matrix surface area deactivated at a faster rate than zeolite surface. In principal, the method used as in this example, in combination with existing hydrothermal or CPS deactivation protocol, can be used to simulate commercial ECAT and match zeolite surface area and matrix surface area simultaneously.

Hydration/Dehydration Testing

Preliminary testing was conducted to determine the effect on catalyst features such as zeolite surface area, matrix surface area and unit cell size from hydration/dehydration cycling, and in particular, the effects of varying cycle temperatures, the numbers of cycles, and the use of additional redox steps. Also studied was the effect of the various combinations of CPS/MM treatments and CHS. Example 5 demonstrates high temperature cycles with mild hydration. Examples 6-15 evaluate the effects of different temperatures (200° F./1450° F.) in the hydration and dehydration cycles, respectively, as well as the effects of metals. Examples 16-21 evaluate the effects of varying the number of hydration cycles at low temperature, combined with redox reactions at high temperature. Comparative Examples 32 & 33, and Examples 34-41 evaluate the effects of varying the number of CHS cycles with a separate CPS step, as well as varying dehydration temperature compared to commercial ECAT. Control Example 42 and Examples 43-46 evaluate the effects of a single temperature for both the hydration and dehydration steps, for various temperatures. A separate CPS step is included before the hydration/dehydration steps to isolate affects on the matrix surface area and Unit Cell Size. Control Example 47 and Examples 48-51 evaluate the affects of performing the CPS step after the hydration/dehydration steps. Comparative Example 52, and Examples 53, 54 and 55 evaluate the effects of an initial CPS treatment followed by hydration/dehydration, followed in turn by a second CPS treatment. Comparative Examples 56 and 60, Comparative Example 61, and Examples 57-59, and 62 evaluate the effects of an initial CPS treatment followed by hydration/dehydration, followed in turn by a second CPS treatment.

Example 5

The FCC catalyst used for Example 5 is as in Example 1. The catalyst was first calcined one hour at 1500° F. The sample was then cooled to room temperature and placed in an open dish inside a closed 2.5 gallon bucket overnight with shallow water on the bottom of the bucket, where water had no direct contact with the catalyst sample. The procedure was repeated 20 times. The results are summarized in Table 5.

TABLE 5

| | Cycle #1 | Cycle #2 | Cycle #3 | Cycle #4 | Cycle #5 | Cycle #6 | Cycle #7 | Cycle #8 | Cycle #9 | Cycle #10 | Cycle #11 | Cycle #12 |
|---|---|---|---|---|---|---|---|---|---|---|---|---|
| Surface Area, m²/g: | 257 | 244 | 243 | 237 | 229 | 229 | 226 | 221 | 216 | 219 | 210 | 214 |
| ZSA, m²/g: | 161 | 152 | 152 | 149 | 145 | 146 | 144 | 137 | 135 | 136 | 131 | 132 |
| MSA, m²/g: | 96 | 92 | 91 | 88 | 84 | 83 | 82 | 84 | 81 | 83 | 79 | 83 |
| Unit Cell Size | 24.52 | 24.50 | 24.49 | 24.49 | 24.48 | 24.47 | 24.46 | 24.46 | 24.45 | 24.44 | 24.44 | 24.43 |

| | Cycle #13 | Cycle #14 | Cycle #15 | Cycle #16 | Cycle #17 | Cycle #18 | Cycle #19 | Cycle #20 | Cycle #21 | Cycle #22 | Cycle #23 |
|---|---|---|---|---|---|---|---|---|---|---|---|
| Surface Area, m²/g: | 211 | 211 | 207 | 205 | 201 | 203 | 199 | 200 | 196 | 194 | 196 |
| ZSA, m²/g: | 131 | 131 | 131 | 128 | 126 | 125 | 125 | 125 | 122 | 120 | 121 |
| MSA, m²/g: | 80 | 80 | 76 | 77 | 75 | 77 | 74 | 75 | 74 | 74 | 75 |
| Unit Cell Size | 24.43 | 24.42 | 24.41 | 24.41 | 24.39 | 24.39 | 24.39 | 24.39 | 24.38 | 24.37 | 24.38 |

The results of Table 5 demonstrate that in principal, the hydration/dehydration method used, such as in the example, in combination with existing hydrothermal or CPS deactivation protocol can be used to simulate commercial ECAT and match zeolite surface area and matrix surface area simultaneously.

Examples 6-15

The FCC catalyst used for Examples 6-15 is as in Example 1. For each example, 130 g of the catalyst was fluidized in a quartz tube. A metal tube was inserted that extends down into the quartz tube to deliver moist nitrogen, and creates a humid environment during the "hydration" step by flow 20 g/hr water rate and 250 cc/min nitrogen. The quartz tube was inside a tube furnace, and equipped with a thermal couple to control the temperature. The CHS deactivation consists of 15 hydration (at 200° F.)/dehydration (at 1450° F.) cycles and 2 CPS cycles following each hydration/dehydration cycle. The results are summarized in Table 6.

TABLE 6

|  | Low Temperature hydration | High Temperature Calcination | Metals Impregnation | # of Cycles | SA | MSA | ZSA | Z/M |
|---|---|---|---|---|---|---|---|---|
| Ex. 6 | 400 F. | 1450 F. | None | 45 | 217 | 94 | 123 | 1.3 |
| Ex. 7 | 200 F. | 1450 F. | None | 6 | 228 | 95 | 133 | 1.4 |
| Ex. 8 | 200 F. | 1450 F. | None | 12 | 213 | 85 | 127 | 1.5 |
| Ex. 9 | 200 F. | 1450 F. | None | 19 | 198 | 77 | 121 | 1.6 |
| Ex. 10 | 200 F. | 1450 F. | None | 25 | 191 | 72 | 119 | 1.7 |
| Ex. 11 | 200 F. | 1450 F. | None | 45 | 181 | 62 | 119 | 1.9 |
| Ex. 12 | 200 F. | 1450 F. | 2000 ppm Ni/3000 ppm V | 12 | 208 | 83 | 125 | 1.5 |
| Ex. 13 | 200 F. | 1450 F. | 2000 ppm Ni/3000 ppm V | 25 | 190 | 71 | 119 | 1.7 |
| Ex. 14 | 200 F. | 1450 F. | 2000 ppm Ni/3000 ppm V | 35 | 172 | 65 | 107 | 1.6 |
| Ex. 15 | 200 F. | 1450 F. | 2000 ppm Ni/3000 ppm V | 48 | 166 | 61 | 105 | 1.7 |

The data of table 6 demonstrates practical ways of varying CHS cycles to simulate zeolite surface area, matrix surface area and their ratios.

Examples 16-31

The FCC catalyst used for Examples 16 to 31 is as in Example 1. Various numbers of CHS cycles at high and low temperatures were conducted, with particular examples utilizing redox cycles following each hydration/dehydration cycle. The results are summarized in Table 7.

TABLE 7

| | Low Temperature 200 F. | | | High Temperature 1450 F. | | | | | | |
|---|---|---|---|---|---|---|---|---|---|---|
| | Cycles | Time, min | Time, min | Water rate g/h | $N_2$ rate L/h | Redox Cycles time Minute oxi/$N_2$/Red/$N_2$ | TSA | ZSA | MSA | UCS |
| Ex. 16 | 25 | 40 | 25 | 1.5 | 200 | No | 184 | 115 | 69 | 24.33 |
| Ex. 17 | 20 | 40 | 25 | 5 | 200 | No | 162 | 104 | 58 | 24.27 |
| Ex. 18 | 45 | 40 | 25 | 5 | 200 | No | 165 | 102 | 63 | 24.28 |
| Ex. 19 | 25 | 40 | 25 | 7.3 | 200 | No | 141 | 88 | 53 | 24.25 |
| Ex. 20 | 25 | 40 | 25 | 15 | 200 | No | 152 | 93 | 60 | 24.26 |
| Ex. 21 | 15 | 40 | 25 | 13 | 105 | No | 134 | 78 | 56 | 24.25 |
| Ex. 22 | 25 | 40 | 25 | 13 | 105 | No | 130 | 78 | 52 | 24.26 |
| Ex. 23 | 15 | 40 | 42 | 17 | 105 | No | 137 | 81 | 56 | 24.25 |
| Ex. 24 | 15 | 40 | 42 | 7.3 | 105 | No | 152 | 97 | 55 | 24.27 |
| Ex. 25 | 15 | 40 | 30 | 17 | 105 | 14, 2, 14 | 153 | 90 | 63 | 24.28 |
| Ex. 26 | 15 | 15 | 30 | 17 | 105 | No | 140 | 74 | 66 | 24.26 |
| Ex. 27 | 15 | 30 | 30 | 17 | 105 | No | 142 | 83 | 59 | 24.25 |
| Ex. 28 | 15 | 40 | 30 | 17 | 105 | 14, 2, 14 | 152 | 92 | 60 | 24.28 |
| Ex. 29 | 15 | 30 | 42 | 17 | 105 | 20, 2, 20 | 148 | 84 | 64 | 24.27 |
| Ex. 30 | 15 | 30 | 42 | 17 | 105 | 20, 2, 20 | 143 | 81 | 62 | 24.27 |
| Ex. 31 | 15 | 30 | 40 | 17 | 105 | 10, 10, 10, 10 | 141 | 78 | 63 | 24.28 |

The results of Table 7 demonstrate practical ways of varying CHS cycles in combine with redox cycles at high temperature to simulate zeolite surface area and matrix surface area and their ratios as well as zeolite unit cell size.

Comparative Examples 32 & 33 and Examples 34-41

Comparative Example 32 is a commercial ECAT sample produced in an FCC Unit using a fresh catalyst as in Example 1. Comparative Example 33 is a catalyst as in Example 1 that was subjected to 30 cycles of CPS deactivation with metals impregnation without CHS. Examples 34 to 41 are each a catalyst as in Example 1 which were subjected to the same CPS deactivation as Comparative Example 33, followed by varying numbers of hydration/dehydration cycles. Hydrations were all carried out at 200° F. for 30 minutes while dehydration were conducted at various temperatures for 30 minutes from 300° F. to 1450° F., as shown in Table 8. Properties of the metallated/deactivated catalyst is listed in Table 8. ACE performance testing for the catalyst samples are listed in Table 9.

TABLE 8

|  |  | Comparative Ex. 32 | Comparative Ex. 33 | Ex. 34 | Ex. 35 | Ex. 36 | Ex. 37 | Ex. 38 | Ex. 39 | Ex. 40 | Ex. 41 |
|---|---|---|---|---|---|---|---|---|---|---|---|
| CHS Cycles |  |  | None | 7 | 14 | 16 | 16 | 16 | 16 | 16 | 16 |
| Dehydration Temp |  | Commercial ECAT | CPS Only | 1450 | 1450 | 1300 | 1100 | 900 | 700 | 500 | 300 |
| $Al_2O_3$ | wt. % | 50.5 | 49.5 | 52 | 49.2 | 50.3 | 51.3 | 50.1 | 50.2 | 49.1 | 50.0 |
| RE2O3 | wt. % | 2.09 | 2.0 | 2 | 1.9 | 2.0 | 2.0 | 2.0 | 2.0 | 2.0 | 2.0 |
| Ni | Ppm | 1276 | 2082 | 2075 | 2090 | 2131 | 2093 | 2061 | 2133 | 2082 | 2010 |
| V | Ppm | 3600 | 3250 | 3200 | 3170 | 3240 | 3260 | 3250 | 3230 | 3020 | 3180 |
| SA | m2/g | 141 | 173 | 156 | 152 | 151 | 153 | 162 | 159 | 161 | 167 |
| Zeolite | m2/g | 78 | 88 | 92 | 95 | 91 | 92 | 99 | 100 | 96 | 101 |
| Matrix | m2/g | 63 | 85 | 64 | 57 | 60 | 61 | 63 | 59 | 65 | 66 |
| Unit Cell | Å | 24.30 | 24.28 | 24.27 | 24.26 | 24.27 | 24.28 | 24.28 | 24.29 | 24.29 | 24.29 |

The data of Table 8 demonstrates that cyclical hydration and dehydration can be used in combine with existing CPS deactivation and reduce matrix surface area.

TABLE 9

|  | Comparative Ex. 32 | Comparative Ex. 33 | Ex. 36 | Ex. 37 | Ex. 38 | Ex. 39 |
|---|---|---|---|---|---|---|
| CHS Cycles |  | None | 16 | 16 | 16 | 16 |
| DehydrationTemp, DegF. | Commercial ECAT #1 | CPS Only | 1300 | 1100 | 900 | 700 |
| Cat/Oil | 7.6 | 7.9 | 5.4 | 5.2 | 4.1 | 4.2 |
| Hydrogen | 0.43 | 0.66 | 0.61 | 0.41 | 0.34 | 0.38 |
| Dry Gas | 3.3 | 3.4 | 3.3 | 3.1 | 2.8 | 2.9 |
| Propylene | 5.1 | 5.0 | 5.2 | 5.5 | 5.4 | 5.5 |
| Total $C_3$'s | 6.4 | 5.9 | 6.3 | 6.7 | 6.5 | 6.7 |
| Total $C_4$='s | 6.5 | 7.0 | 6.8 | 6.8 | 6.9 | 6.9 |
| Total $C_4$'s | 11.6 | 10.9 | 11.6 | 12.3 | 12.4 | 12.3 |
| Gasoline | 48.6 | 49.0 | 47.9 | 48.2 | 48.8 | 48.3 |
| LCO | 17.5 | 18.3 | 17.6 | 17.2 | 17.4 | 17.4 |
| Bottoms | 5.5 | 4.7 | 5.4 | 5.7 | 5.6 | 5.6 |
| Coke | 7.1 | 7.9 | 8.1 | 7.1 | 6.6 | 6.9 |

Compared to the sample deactivated by CPS only, all samples treated by cyclic hydration and dehydration after CPS deactivation had a matrix surface area closer to the commercial ECAT sample, and therefore had similar bottoms yield at constant conversion with the commercial ECAT. All of these samples, except the sample cyclically dehydrated at 1300° F., had closer hydrogen and coke yields to the commercial ECAT than the CPS deactivated only sample. The results of Table 8 & 9 demonstrate a practical way of combining various CHS cycles with a regular CPS deactivation and achieve a better match to commercial ECAT in matrix surface area, as well as coke, hydrogen, and bottoms yields.

Control Example 42 & Examples 43-46

Control Example 42 and Examples 43-46 are fresh catalyst samples as in Example 1. Examples 43-46 were prepared by CPS deactivation at 1450° F. with 2000 ppm Ni and 3000 ppm V, followed by 45 minute cycles of hydration and dehydration. All hydration and dehydrations was conducted at the same temperatures. Properties of the metallated/deactivated catalyst are listed in Table 10.

TABLE 10

|  |  | Control Ex. 42 | Ex. 43 | Ex. 44 | Ex. 45 | Ex. 46 |
|---|---|---|---|---|---|---|
| CHS Cycles |  | None | 32 | 32 | 120 | 120 |
| Hyd/Dehydration Temp, DegF. |  | CPS Only | 200 | 400 | 1000 | 800 |

TABLE 10-continued

|  |  | Control Ex. 42 | Ex. 43 | Ex. 44 | Ex. 45 | Ex. 46 |
|---|---|---|---|---|---|---|
| $Al_2O_3$ | wt. % | 49.5 | 51.6 | 50.7 | 50.2 | 50.4 |
| $RE_2O_3$ | wt. % | 2.0 | 2.1 | 2.1 | 2.0 | 1.9 |
| $Na_2O$ | wt. % | 0.28 | 0.27 | 0.27 | 0.26 | 0.29 |
| Ni | ppm | 2082 | 2161 | 2122 | 2175 | 2071 |
| V | ppm | 3250 | 3200 | 3250 | 3280 | 3130 |
| SA | m2/g | 173 | 156 | 160 | 158 | 160 |
| Zeolite | m2/g | 88 | 93 | 80 | 78 | 81 |
| Matrix | m2/g | 85 | 63 | 80 | 80 | 79 |
| Unit Cell | Å | 24.28 | 24.27 | 24.28 | 24.27 | 24.27 |

The data of Table 10 demonstrates that in these examples when hydration and dehydration are conducted at the same temperature, 200° F. is the temperature at which matrix surface area is mostly effectively reduced.

Control Example 47 and Examples 48-51

Control Example 47 and Examples 48 to 51 are fresh catalyst samples as in Example 1. Examples 48 to 51 were prepared by deactivation by cycles of hydration and dehydration, followed by CPS at 1450° F. with 2000 ppm Ni and 3000 ppm V. All hydration and dehydration was conducted at the same temperatures. Properties of the deactivated/metallated catalyst are listed in Table 11.

TABLE 11

|  |  | Control Ex. 47 | Ex. 48 | Ex. 49 | Ex. 50 | Ex. 51 |
|---|---|---|---|---|---|---|
| CHS Cycles |  | None | 48 | 64 | 48 | 64 |
| Hyd/Dehydration Temp, DegF. |  |  | 200 | 200 | 225 | 225 |
| $Al_2O_3$ | wt. % | 49.2 |  |  |  |  |
| $RE_2O_3$ | wt. % | 2.02 |  |  |  |  |
| $Na_2O$ | wt. % | 0.29 |  |  |  |  |
| Ni | ppm |  | 2090 | 2106 | 2101 | 2083 |
| V | ppm |  | 3280 | 3190 | 3160 | 3200 |
| After CHS |  |  |  |  |  |  |
| SA | m2/g | 269 | 248 | 253 | 248 | 240 |
| Zeolite | m2/g | 155 | 166 | 171 | 162 | 158 |
| Matrix | m2/g | 114 | 82 | 82 | 86 | 82 |
| Unit Cell | Å | 24.55 | 24.55 | 24.55 | 24.54 | 24.5 |
| After CPS |  |  |  |  |  |  |
| SA | m2/g |  | 154 | 140 | 144 | 146 |
| Zeolite | m2/g |  | 83 | 68 | 70 | 72 |
| Matrix | m2/g |  | 71 | 72 | 74 | 74 |
| Unit Cell | Å |  | 24.27 | 24.24 | 24.23 | 24.29 |

The results of Table 11 demonstrate another way of combining cyclical hydration and dehydration methods with existing CPS deactivation to reduce matrix surface area.

Comparative Example 52 & Examples 53-55

Comparative Example 52 is a commercial ECAT sample produced in a FCC Unit using a fresh catalyst Midas-2. Examples 53 to 55 use the same fresh catalyst as in the commercial unit.

Example 53 was subjected to 30 cycles of CPS deactivation with metals impregnation but without CHS. Example 54 was subjected to the same CPS deactivation as Example 53, followed by 32 cycles of CHS at 200° F., with 15 minutes water on and 15 minutes water off. Example 55 was subjected to the same CPS deactivation as Example 53 followed by 32 cycles of CHS at 200° F., with 15 minutes water on and 15 minutes water off, and followed by 6 cycles of CPS deactivation. Properties of the metallated/deactivated catalyst are listed in Table 12.

TABLE 12

|  |  | Comparative Ex. 52 Commercial ECAT | Ex. 53 CPS only | Ex. 54 CPS + CHS at 200 F. | Ex. 55 CPS + CHS at 200 F. + CPS |
|---|---|---|---|---|---|
| $Al_2O_3$ | wt. % | 54.7 | 54.2 |  |  |
| $RE_2O_3$ | wt. % | 2.1 | 1.9 |  |  |
| Ni | ppm | 1549 | 1948 | 1942 | 1937 |
| V | ppm | 3752 | 3030 | 3160 | 3170 |
| SA | m2/g | 142 | 170 | 169 | 158 |
| Zeolite | m2/g | 66 | 80 | 91 | 78 |
| Matrix | m2/g | 76 | 90 | 78 | 80 |
| Unit Cell | Å | 24.31 | 24.30 | 24.31 | 24.29 |

The data of Table 12 demonstrates combining CHS with existing CPS deactivation to achieve a better match in matrix surface area.

Comparative Example 56 and Examples 57 to 59

Comparative Example 56 is a commercial ECAT sample produced in an FCC Unit using a fresh catalyst as in Example 1. Examples 57 to 59 also use a fresh catalyst as in Example 1. Example 57 was subjected to 30 cycles of CPS deactivation with metals impregnation without CHS. Example 58 was subjected to the same CPS deactivation as Example 57 followed by 32 cycles of CHS at 200° F., with 30 minutes water on and 30 minutes water off. Example 59 was subjected to the same CPS deactivation as Example 57 followed by 32 cycles of CHS at 200° F., with 30 minutes water on and 30 minutes water off, and followed by 5 cycles of CPS deactivation. Properties of the metallated/deactivated catalyst are listed in Table 13. ACE performance testing is listed in Table 14.

TABLE 13

|  |  | Comparative Ex. 56 Commercial ECAT | Ex. 57 CPS only | Ex. 58 CPS + CHS at 200 F. | Ex. 59 CPS + CHS at 200 F. + CPS |
|---|---|---|---|---|---|
| $Al_2O_3$ | wt. % | 48.9 | 50.8 | 51.4 | 50.8 |
| RE2O3 | wt. % | 2.1 | 2.1 | 2.1 | 2.1 |
| Ni | Ppm | 1291 | 2111 | 2097 | 2145 |
| V | Ppm | 3590 | 3190 | 3330 | 3290 |
| SA | m2/g | 135 | 177 | 173 | 161 |
| Zeolite | m2/g | 73 | 96 | 108 | 98 |
| Matrix | m2/g | 62 | 81 | 65 | 63 |
| Unit Cell | Å | 24.30 | 24.28 | 24.29 | 24.27 |

TABLE 14

Conversion 74

|  | Comparative Ex. 56 | Ex. 57 | Ex. 58 | Ex. 59 |
|---|---|---|---|---|
| CPS |  | CPS Only | CPS + CHS at 200 F. | CPS + CHS at 200 F. + CPS |
| CHS Cycles |  | None | 16 | 16 |
| Cat/Oil | 6.3 | 6.6 | 4.5 | 6.1 |
| Hydrogen | 0.5 | 0.7 | 0.5 | 0.5 |
| Methane | 1.3 | 1.2 | 1.0 | 1.1 |
| Ethylene | 0.6 | 0.6 | 0.6 | 0.6 |
| Dry Gas | 3.2 | 3.2 | 2.7 | 2.8 |
| Propylene | 4.7 | 4.4 | 4.8 | 4.7 |
| Total $C_3$'s | 5.8 | 5.2 | 5.7 | 5.5 |
| Total $C_4$='s | 6.3 | 6.2 | 6.3 | 6.5 |
| Total $C_4$'s | 10.5 | 9.4 | 10.5 | 10.3 |
| Gasoline | 48.3 | 46.3 | 47.1 | 47.4 |
| LCO | 19.5 | 20.1 | 19.4 | 19.6 |
| Bottoms | 6.5 | 5.9 | 6.6 | 6.4 |
| Coke | 6.7 | 9.9 | 8.1 | 8.4 |

The data of Tables 13 and 14 demonstrates that compared to the sample deactivated by CPS alone, the two samples treated by cyclic hydration and dehydration after CPS deactivation possessed matrix surface area closer to the commercial ECAT sample, and therefore had similar bottoms yield at constant conversion with the commercial ECAT. Both samples also possessed closer hydrogen and coke yields to the commercial ECAT than the CPS-alone deactivated sample. The samples treated by cyclic hydration and dehydration after CPS deactivation and followed by 5 cycles of CPS had lower zeolite surface area, and therefore were closer to the commercial ECAT sample in activity.

The results of Table 13 & 14 demonstrate a practical way of combining CHS cycles with regular CPS deactivations and achieve a better match to commercial ECAT in matrix surface area as well as coke, hydrogen, and bottoms yields.

Comparative Examples 60 and 61, and Example 62

Comparative Examples 60 is a commercial ECAT sample produced in an FCC Unit using a fresh catalyst as in Example 1. Comparative Example 61 and Example 62 also use a fresh catalyst as in Example 1. Comparative Example 61 was subjected to 30 cycles of CPS deactivation with metals impregnation without CHS. Example 62 was subjected to the same CPS deactivation as Example 57 followed by 32 cycles of CHS at 200° F., with 30 minutes water on and 30 minutes water off, followed by 6 cycles of CPS deactivation. Properties of the metallated/deactivated catalyst are listed in Table 15. ACE performance testing is listed in Table 16.

TABLE 15

|  |  | Comparative Ex. 60 Commercial ECAT | Comparative Ex. 61 30 cycles CPS deactivation only | Ex. 62 30 cycles CPS + 32 cycles CHS at 200 F. + 6 cycles of CPS |
|---|---|---|---|---|
| Al$_2$O$_3$ | wt. % | 49.0 | 50.7 | 51.6 |
| RE2O3 | wt. % | 1.97 | 1.93 | 1.97 |
| Ni | Ppm | 1188 | 2015 | 2085 |
| V | Ppm | 3350 | 3260 | 3270 |
| SA | m2/g | 137 | 175 | 161 |
| Zeolite | m2/g | 79 | 95 | 94 |
| Matrix | m2/g | 58 | 80 | 67 |
| Unit Cell | Å | 24.30 | 24.28 | 24.29 |

TABLE 16

| | Conversion 69 | | |
|---|---|---|---|
| | Comp. Ex. 60 Commercial ECAT | Comp. Ex. 61 30 cycles CPS Deactivation Only | Ex. 62 30 cycles CPS + 32 cycles CHS at 200 F. + 6 cycles of CPS |
| Cat/Oil | 5.8 | 5.9 | 6.2 |
| Hydrogen | 0.3 | 0.7 | 0.5 |
| Methane | 0.8 | 0.9 | 0.9 |
| Ethylene | 0.5 | 0.5 | 0.5 |
| Dry Gas | 2.2 | 2.5 | 2.4 |
| Propylene | 4.5 | 4.0 | 4.3 |
| Total C$_3$'s | 5.3 | 4.7 | 5.0 |
| Total C$_4$='s | 6.1 | 6.2 | 6.3 |
| Total C$_4$'s | 10.1 | 9.0 | 9.4 |
| Gasoline | 46.0 | 46.2 | 46.5 |
| LCO | 22.0 | 23.1 | 23.1 |
| Bottoms | 8.6 | 7.5 | 7.5 |
| Coke | 5.7 | 6.9 | 5.9 |

The data of Tables 15 and 16 demonstrate that compared to the sample deactivated by CPS only, the samples treated by cyclic hydration and dehydration after CPS deactivation and followed by 6 cycles of CPS again had matrix surface area closer to the commercial ECAT, and had closer hydrogen and coke yields to the commercial ECAT than the CPS deactivated only sample.

Catalyst Family Testing

Comparative Examples 63, 66, 69, 72, 75, 78, 81, 84, and 87, and Examples 64-65, 67-68, 70-71, 73-74, 76-77, 79-80, 82-83, and 88-89 evaluate commercial catalysts having varying zeolite/matrix/binder formulations, by deactivation according to protocols developed in the above examples. Comparative Examples 63, 66, 69, 72, and 75, and Examples 64-65, 67-68, 70-71, 73-74, and 76-77 evaluated various commercial FCC catalysts using a deactivation protocol of a CPS deactivation only, relative to a CPS deactivation followed by a CHS procedure, and a CPS deactivation followed by a CHS procedure followed by a CPS procedure. Comparative Examples 78, 81, 84, 87, and Examples 79-80, 82-83, 85-86, and 88-89, evaluated various commercial FCC catalysts using a deactivation protocol of an MM deactivation only, relative to an MM deactivation followed by a CHS procedure, and an MM deactivation followed by a CHS procedure followed by an MM procedure Comparative Example 63 and Examples 64 and 65

The FCC catalyst used for Comparative Example 63 and Examples 64 and 65 is Impact, commercially available from W.R. Grace. Each of the catalysts was impregnated with nickel and vanadium prior to deactivation. Comparative Example 63 was deactivated by CPS at 1450° F. ("CPS procedure 1"). Example 64 was deactivated by CPS procedure 1 followed by 32 cycles of hydration/dehydration at 200° F. ("CHS procedure 1"). Example 65 was deactivated by CPS procedure 1, followed by CHS procedure 1, followed by six cycles of a second CPS treatment at 1450° F. (CPS procedure 2). Fresh and deactivated properties for Comparative Example 63 and Examples 64 and 65 are shown in Table 17.

Comparative Example 66 and Examples 67 and 68

The FCC catalyst used for Comparative Example 66 and Examples 67 and 68 is ResidUltra, commercially available from W.R. Grace. Each of the catalysts was impregnated with nickel and vanadium prior to deactivation. Comparative Example 66 was deactivated as Comparative Example 63. Example 67 was deactivated as Example 64, and Example 68 was deactivated as Example 65. Fresh and deactivated properties for Comparative Example 66 and Examples 67 and 68 are shown in Table 17.

TABLE 17

| | | Comp. Ex. 63 | Ex. 64 | Ex. 65 | Comp. Ex. 66 | Ex. 67 | Ex. 68 |
|---|---|---|---|---|---|---|---|
| Al$_2$O$_3$ | Wt. % | 45.5 | 45.5 | 45.5 | 51.4 | 51.4 | 51.4 |
| Re$_2$O$_3$ | Wt. % | 5.77 | 5.77 | 5.77 | 3.67 | 3.67 | 3.67 |
| SA |  |  |  |  |  |  |  |
| Fresh Zeolite | m$^2$/g | 277 | 277 | 277 | 269 | 269 | 269 |
| Fresh Matrix | m$^2$/g | 60 | 60 | 60 | 50 | 50 | 50 |
| Fresh Total | m$^2$/g | 337 | 337 | 337 | 319 | 319 | 319 |
| Deactivation |  |  |  |  |  |  |  |
| Ni | ppm | 2229 | 2287 | 2278 | 2049 | 2127 | 2175 |
| V | ppm | 3180 | 3290 | 3270 | 3230 | 3200 | 3380 |
| SA |  |  |  |  |  |  |  |

TABLE 17-continued

|  |  | Comp. Ex. 63 | Ex. 64 | Ex. 65 | Comp. Ex. 66 | Ex. 67 | Ex. 68 |
|---|---|---|---|---|---|---|---|
| Zeolite | m²/g | 162 | 166 | 155 | 152 | 156 | 141 |
| Matrix | m²/g | 37 | 30 | 30 | 31 | 23 | 25 |
| Total | m²/g | 199 | 196 | 185 | 183 | 179 | 169 |
| Unit Cell | Å | 24.31 | 24.32 | 24.30 | 24.28 | 24.30 | 24.28 |

The results summarized in Table 17 demonstrate that the CHS procedure after CPS lowers the matrix surface area, and leads to a small increase in the zeolite surface area when comparing example 64 to Comparative example 63, or example 67 to Comparative Example 66. Examples 65 and 68 show that the 6 CPS cycles after the CHS procedure can lower the zeolite surface area without affecting the matrix surface area significantly.

Comparative Example 69 and Examples 70 and 71

The FCC catalyst used for Comparative Example 69, and Examples 70 and 71 is Midas-1, commercially available from W.R. Grace. Each of the catalysts was impregnated with nickel and vanadium prior to the deactivation. Comparative Example 69 was deactivated as Comparative Example 63. Example 70 was deactivated as Example 64, and Example 71 was deactivated as Example 65. Fresh and deactivated properties for Comparative Example 69 and Examples 70 and 71 are shown in Table 18.

Comparative Example 72 and Examples 73 and 74

The FCC catalyst used for Comparative Example 72 and Examples 73 and 74 is Midas-2, commercially available from W.R. Grace. Each of the catalysts was impregnated with nickel and vanadium prior to the deactivation. Comparative Example 72 was deactivated as Comparative Example 63. Example 73 was deactivated as Example 64, and Example 74 was deactivated as Example 65. Fresh and deactivated properties for Comparative Example 72 and Examples 73 and 74 are shown in Table 18.

The results summarized in Table 18 demonstrate that the CHS procedure after CPS lowers the matrix surface area and leads to a small increase in the zeolite surface area when comparing Example 70 to Comparative Example 69, or example 73 to Comparative Example 72. Examples 71 and 74 show that the 6 CPS cycles after the CHS procedure can lower the zeolite surface area without affecting the matrix surface area significantly.

Comparative Example 75 and Examples 76 and 77

The FCC catalyst used for Comparative Example 75 and Examples 76 and 77 is NaceR, commercially available from W.R. Grace. Each of the catalysts was impregnated with nickel and vanadium prior to the deactivation. Comparative Example 75 was deactivated as Comparative Example 63. Example 76 was deactivated as Example 64, and Example 77 was deactivated as Example 65. Fresh and deactivated properties for Comparative Example 75 and Examples 76 and 77 are shown in Table 19.

TABLE 19

|  |  | Comp. Ex. 75 | Ex. 76 | Ex. 77 |
|---|---|---|---|---|
| $Al_2O_3$ | Wt. % | 59.2 | 59.2 | 59.2 |
| $Re_2O_3$ | Wt. % | 1.98 | 1.98 | 1.98 |
| SA |  |  |  |  |
| Fresh Zeolite | m²/g | 159 | 159 | 159 |
| Fresh Matrix | m²/g | 143 | 143 | 143 |
| Fresh Total | m²/g | 302 | 302 | 302 |

TABLE 18

|  |  | Comp. Ex. 69 | Ex. 70 | Ex. 71 | Comp. Ex. 72 | Ex. 73 | Ex. 74 |
|---|---|---|---|---|---|---|---|
| $Al_2O_3$ | Wt. % | 51.4 | 51.4 | 51.4 | 54.5 | 54.5 | 54.5 |
| $Re_2O_3$ | Wt. % | 2.13 | 2.13 | 2.13 | 1.88 | 1.88 | 1.88 |
| SA |  |  |  |  |  |  |  |
| Fresh Zeolite | m²/g | 162 | 162 | 162 | 151 | 151 | 151 |
| Fresh Matrix | m²/g | 121 | 121 | 121 | 130 | 130 | 130 |
| Fresh Total | m²/g | 283 | 283 | 283 | 281 | 281 | 281 |
| Deactivation |  |  |  |  |  |  |  |
| Ni | ppm | 2063 | 1958 | 2024 | 1948 | 1942 | 1937 |
| V | ppm | 3140 | 3230 | 3200 | 3030 | 3160 | 3170 |
| SA |  |  |  |  |  |  |  |
| Zeolite | m²/g | 95 | 103 | 92 | 80 | 91 | 78 |
| Matrix | m²/g | 79 | 67 | 67 | 90 | 78 | 80 |
| Total | m²/g | 174 | 170 | 159 | 170 | 169 | 158 |
| Unit Cell | Å | 24.28 | 24.29 | 24.28 | 24.30 | 24.31 | 24.29 |

TABLE 19-continued

|  |  | Comp. Ex. 75 | Ex. 76 | Ex. 77 |
|---|---|---|---|---|
| Deactivation |  |  |  |  |
| Ni | ppm | 2012 | 1957 | 1985 |
| V | ppm | 3190 | 3100 | 3180 |
| SA |  |  |  |  |
| Zeolite | m$^2$/g | 82 | 93 | 83 |
| Matrix | m$^2$/g | 99 | 84 | 86 |
| Fresh Total | m$^2$/g | 181 | 177 | 169 |
| Unit Cell | Å | 24.33 | 24.33 | 24.31 |

The results summarized in Table 19 demonstrate that the CHS procedure after CPS lowers the matrix surface area and leads to a small increase in the zeolite surface area when comparing Example 76 to Comparative Example 75. Example 76 demonstrates that the 6 CPS cycles after the CHS procedure can lower the zeolite surface area without affecting the matrix surface area significantly.

Comparative Example 78 and Examples 79 and 80

The catalyst used for Comparative Example 78 and Examples 79 and 80 is NaceR, commercially available from W.R. Grace. Comparative Example 78 was deactivated by subjecting the catalyst to 1450° F. 100% steam for 16 hours ("MM procedure 1"). Example 79 was deactivated by subjecting the catalyst to MM procedure 1, followed by CHS procedure 1. Example 80 was deactivated by subjecting the catalyst to MM procedure 1, followed by CHS procedure 1, followed by subjecting the catalyst to 1450° F. 100% steam for 2 hours ("MM procedure 2"). Fresh and deactivated properties for Comparative Example 78 and Examples 79 and 80 are shown in Table 20.

Comparative Example 81 and Examples 82 and 83

The FCC catalyst used for Comparative Example 81 and Examples 82 and 83 is DieseliseR, commercially available from W.R. Grace. Comparative Example 81 was deactivated as Comparative Example 78. Example 82 was deactivated as Example 79, and Example 83 was deactivated as Example 80. Fresh and deactivated properties for Comparative Example 81 and Examples 82 and 83 are shown in Table 20.

TABLE 20

|  |  | Comp. Ex. 78 | Ex. 79 | Ex. 80 | Comp. Ex. 81 | Ex. 82 | Ex. 83 |
|---|---|---|---|---|---|---|---|
| Al$_2$O$_3$ | Wt. % | 46.9 | 46.9 | 46.9 | 60.7 | 60.7 | 60.7 |
| Re$_2$O$_3$ | Wt. % | 1.43 | 1.43 | 1.43 | 3.09 | 3.09 | 3.09 |
| SA |  |  |  |  |  |  |  |
| Fresh Zeolite | m$^2$/g | 215 | 215 | 215 | 51 | 51 | 51 |
| Fresh Matrix | m$^2$/g | 120 | 120 | 120 | 161 | 161 | 161 |
| Fresh Total | m$^2$/g | 335 | 335 | 335 | 212 | 212 | 212 |
| Deactivation |  |  |  |  |  |  |  |
| SA |  |  |  |  |  |  |  |
| Zeolite | m$^2$/g | 98 | 110 | 99 | 22 | 35 | 26 |
| Matrix | m$^2$/g | 85 | 73 | 74 | 86 | 74 | 75 |
| Total | m$^2$/g | 183 | 183 | 172 | 108 | 109 | 101 |
| Unit Cell | Å | 24.26 | 24.25 | 24.25 | 24.32 | 24.33 | 24.31 |

The results summarized in Table 20 demonstrate that the CHS procedure after MM procedure 1 lowers the matrix surface area, and leads to a small increase in the zeolite surface area when comparing example 79 to Comparative Example 78, or example 82 to Comparative Example 81. Examples 80 and 83 show that the MM procedure 2 after the CHS procedure can lower the zeolite surface area without affecting the matrix surface area significantly.

Comparative Example 84 and Examples 85 and 86

The FCC catalyst used for Comparative Example 84 and Examples 85 and 86 is Aurora, commercially available from W.R. Grace. Comparative Example 84 was deactivated as Comparative Example 78. Example 85 was deactivated as Example 79, and Example 86 was deactivated as Example 80. Fresh and deactivated properties for Comparative Example 84 and Examples 85 and 86 are shown in Table 21.

TABLE 21

|  |  | Comp. Ex. 84 | Ex. 85 | Ex. 86 |
|---|---|---|---|---|
| Al$_2$O$_3$ | Wt. % | 46.1 | 46.1 | 46.1 |
| Re$_2$O$_3$ | Wt. % | 0.61 | 0.61 | 0.61 |
| SA |  |  |  |  |
| Fresh Zeolite | m$^2$/g | 300 | 300 | 300 |
| Fresh Matrix | m$^2$/g | 61 | 61 | 61 |
| Fresh Total | m$^2$/g | 361 | 361 | 361 |
| Deactivation |  |  |  |  |
| SA |  |  |  |  |
| Zeolite | m$^2$/g | 167 | 173 | 168 |
| Matrix | m$^2$/g | 41 | 36 | 32 |
| Total | m$^2$/g | 208 | 209 | 200 |
| Unit Cell | Å | 24.24 | 24.24 | 24.24 |

The results summarized in Table 21 demonstrate that the CHS procedure after MM procedure 1 lowers the matrix surface area and leads to a small increase in the zeolite surface area when comparing example 85 to Comparative Example 84.

Comparative Example 87 and Examples 88 and 89

The FCC catalyst used for Comparative Example 87 and Examples 88 and 89 is Midas-1. Comparative Example 87 was deactivated as Comparative Example 78. Example 88 was deactivated as Example 79, and Example 89 was deactivated as Example 80. Fresh and deactivated properties for Comparative Example 87 and Examples 88 and 89 are shown in Table 22.

TABLE 22

|  |  | Comp. Ex. 87 | Ex. 88 | Ex. 89 |
|---|---|---|---|---|
| $Al_2O_3$ | Wt. % | 50.6 | 50.6 | 50.6 |
| $Re_2O_3$ | Wt. % | 1.92 | 1.92 | 1.92 |
| SA |  |  |  |  |
| Fresh Zeolite | $m^2/g$ | 162 | 162 | 162 |
| Fresh Matrix | $m^2/g$ | 117 | 117 | 117 |
| Fresh Total | $m^2/g$ | 279 | 279 | 279 |
| Deactivation |  |  |  |  |
| SA |  |  |  |  |
| Zeolite | $m^2/g$ | 97 | 110 | 101 |
| Matrix | $m^2/g$ | 79 | 71 | 67 |
| Total | $m^2/g$ | 176 | 181 | 168 |
| Unit Cell | Å | 24.28 | 24.29 | 24.28 |

The results summarized in Table 22 demonstrate that the cyclic deactivation protocol effectively reduces matrix surface area, without overly reducing zeolite surface area relative to a hydrothermal deactivation alone.

We claim:

1. A process for the laboratory deactivation of a porous solid comprising subjecting the porous solid to a cyclic treatment, the treatment being selected from a hydration/dehydration cyclic treatment, a thermal cyclic treatment, or combinations thereof, the hydration/dehydration cyclic treatment comprising at least five cycles of:
   contacting in a hydration step the porous solid with a hydrating gas stream selected from nitrogen, air, noble gases, water vapor, or mixtures thereof, at a relative humidity of 20 to 100% and a temperature of 50° F. to 400° F., thereby forming a hydrated solid; and
   contacting in a dehydration step the hydrated solid with a dehydrating gas stream comprising water at a relative humidity of less than 20%, and a temperature of from 200° F. to 1600° F., thereby forming a dehydrated solid, wherein for each cycle, except the first cycle, the dehydrated solid is the porous solid for the hydration step in the next cycle; and
the thermal cyclic treatment comprising at least five cycles of:
   heating the porous solid to a heated temperature of 900° F. to 1575° F., thereby forming a heated porous solid; and
   cooling the heated porous solid to a cooled temperature, thereby forming a cooled porous solid, wherein the difference between the heated temperature and the cooled temperature is at least 200° F., and where for each cycle, except the first cycle, the cooled porous solid is the porous solid for the heating step in the next cycle.

2. The process of claim 1 wherein the temperature of the hydration step is from 60 to 230° F.

3. The process of claim 2 wherein the temperature of the hydration step is from 100 to 225° F.

4. The process of claim 1 wherein the temperature of the dehydration step is from 500 to 1575° F.

5. The process of claim 4 wherein the temperature of the dehydration step is from 800 to 1550° F.

6. The process of claim 5 wherein the temperature of the dehydration step is from 950 to 1500° F.

7. The process of claim 1 wherein the dehydrating gas stream is selected from nitrogen, air, noble gases, or mixtures thereof.

8. The process of claim 1 wherein water is present in the hydrating gas stream at a relative humidity of 35 to 90%.

9. The process of claim 1 wherein the concentration of water in the dehydrating gas stream is from 0 to 10%.

10. The process of claim 1 wherein the porous solid is treated in at least 10 hydration-dehydration cycles.

11. The process of claim 10 wherein the porous solid is treated in at least 20 hydration-dehydration cycles.

12. The process of claim 11 wherein the porous solid is treated in at least 30 hydration-dehydration cycles.

13. The process of claim 1 wherein the pressure of the hydrating gas stream is from 14.1 psia to 150 psig.

14. The process of claim 1 wherein the pressure of the dehydrating gas stream is from 14.1 psia to 150 psig.

15. The process of claim 1 wherein the difference between the heated temperature and the cooled temperature is at least 450° F.

16. The process of claim 15 wherein the difference between the heated temperature and the cooled temperature is at least 500° F.

17. The process of claim 1 wherein the heated temperature is 950° F. to 1560° F.

18. The process of claim 17 wherein the heated temperature is 975° F. to 1555° F.

19. The process of claim 18 wherein the heated temperature is 1100° F. to 1550° F.

20. The process of claim 19 wherein the heated temperature is 1250° F. to 1525° F.

21. The process of claim 1 wherein the cooled temperature is 40° F. to 975° F.

22. The process of claim 21 wherein the cooled temperature is 60° F. to 960° F.

23. The process of claim 22 wherein the cooled temperature is 75° F. to 950° F.

24. The process of claim 1 wherein the porous solid is heated with a heating gas.

25. The process of claim 1 wherein the porous solid is cooled with a cooling gas.

26. The process of claim 25 wherein the heating gas is selected from nitrogen, air, noble gases, water vapor, or mixtures thereof.

27. The process of claim 26 wherein the cooling gas is selected from nitrogen, air, noble gases, water vapor, or mixtures thereof.

28. The process of claim 1 wherein the porous solid is a fluid cracking catalyst.

29. The process of claim 28 wherein the fluid cracking catalyst has a fresh zeolite surface area and a fresh matrix surface area.

30. The process of claim 29 wherein the fresh zeolite surface area is from 20 to 500 $m^2/g$.

31. The process of claim 30 wherein the fresh matrix surface area is from 10 to 200 $m^2/g$.

32. The process of claim 31 wherein the fluid cracking catalyst comprises metals selected from nickel, vanadium, iron, sodium or mixtures thereof.

33. The process of claim 32 wherein the level of nickel on the fluid cracking catalyst is from 0 to 20,000 ppm based on the weight of the fluid cracking catalyst.

34. The process of claim 32 wherein the level of vanadium on the fluid cracking catalyst is from 0 to 10,000 ppm based on the weight of the fluid cracking catalyst.

35. A process comprising:
    treating a porous solid in a hydrothermal steaming process, thereby forming a deactivated porous solid;
    subjecting the deactivated porous solid to a cyclic treatment, the cyclic treatment being selected from a hydration/dehydration cyclic treatment, a thermal cyclic treatment, or combinations thereof, the hydration/dehydration cyclic treatment comprising at least five cycles of:
    contacting in a hydration step the deactivated porous solid with a hydrating gas stream selected from nitrogen, air, noble gases, water vapor, or mixtures thereof, at a relative humidity of 20 to 100% and a temperature of 50° F. to 400° F., thereby forming a hydrated solid; and
    contacting in a dehydration step the hydrated solid with a dehydrating gas stream comprising water at a relative humidity of less than 20%, and a temperature of from 200° F. to 1600° F., thereby forming a dehydrated solid, wherein for each cycle, except the first cycle, the dehydrated solid is the deactivated porous solid for the hydration step in the next cycle;
    the thermal cyclic treatment comprising at least five cycles of:
    heating the deactivated porous solid to a heated temperature of 900° F. to 1575° F., thereby forming a heated porous solid; and
    cooling the heated porous solid to a cooled temperature, thereby forming a cooled porous solid,
    wherein the difference between the heated temperature and the cooled temperature is at least 200° F., and where for each cycle, except the first cycle, the cooled porous solid is the deactivated porous solid for the heating step in the next cycle.

36. A process for the laboratory deactivation of a porous solid comprising subjecting the porous solid to a cyclic treatment, the cyclic treatment being selected from a hydration/dehydration cyclic treatment, a thermal cyclic treatment, or combinations thereof, thereby forming a deactivated porous solid,
    the hydration/dehydration cyclic treatment comprising at least five cycles of:
    contacting in a hydration step the porous solid with a hydrating gas stream comprising water at a relative humidity of 20 to 100% and a temperature of 50° F. toy 400° F., thereby forming a hydrated solid; and
    contacting in a dehydration step the hydrated solid with a dehydrating gas stream comprising water at a relative humidity of less than 20% and a temperature of from 200° F. to 1600° F., thereby forming a dehydrated solid,
    wherein for each cycle, except the first cycle, the dehydrated solid is the porous solid for the hydration step in the next cycle;
    the thermal cyclic treatment comprising at least five cycles of:
    heating the porous solid to a heated temperature of 900° F. to 1575° F., thereby forming a heated porous solid; and
    cooling the heated porous solid to a cooled temperature, thereby forming a cooled porous solid, wherein the difference between the heated temperature and the cooled temperature is at least 200° F., and where for each cycle, except the first cycle, the cooled porous solid is the porous solid for the heating step in the next cycle; and
    treating the deactivated porous solid in a hydrothermal or redox deactivation process, thereby forming a deactivated porous solid.

37. A method for deactivating an FCC catalyst having a matrix surface area, to simulate a target matrix surface area comprising:
    (a) treating the FCC catalyst solid in a hydrothermal or redox deactivation process, thereby forming a deactivated FCC catalyst;
    (b) subjecting the deactivated FCC catalyst to a cyclic treatment, thereby forming a cyclically-treated catalyst having a matrix surface area, the cyclic treatment being selected from a hydration/dehydration cyclic treatment, a thermal cyclic treatment, or combinations thereof,
    the hydration/dehydration cyclic treatment comprising at least five cycles of:
    contacting in a hydration step the deactivated FCC catalyst with a hydrating gas stream selected from nitrogen, air, noble gases, water vapor, or mixtures thereof, at a relative humidity of 20 to 100% and a temperature of 50° F. to 400° F., thereby forming a hydrated solid; and
    contacting in a dehydration step the hydrated solid with a dehydrating gas stream comprising water at a relative humidity of less than 20% and a temperature of from 200° F. to 1600° F. and a pressure of 14.3 psia to 28 psia, thereby forming a dehydrated solid, wherein for each cycle, except the first cycle, the dehydrated solid is the deactivated FCC catalyst for the hydration step in the next cycle;
    the thermal cyclic treatment comprising at least five cycles of:
    heating the deactivated FCC catalyst to a heated temperature of 900° F. to 1575° F., thereby forming a heated porous solid; and
    cooling the heated porous solid to a cooled temperature, thereby forming a cooled porous solid, wherein the difference between the heated temperature and the cooled temperature is at least 200° F., and where for each cycle, except the first cycle, the cooled porous solid is the deactivated FCC catalyst for the heating step in the next cycle;
    (c) comparing the matrix surface area of the cyclically-treated catalyst to the target matrix surface area; and
    (d) changing the number cycles of step (b) to adjust the matrix surface area of the cyclically-treated catalyst.

38. A method for deactivating an FCC catalyst having a matrix surface area, to simulate a target matrix surface area comprising:
    (a) subjecting the FCC catalyst to a cyclic treatment, thereby forming a cyclically-treated catalyst having a matrix surface area, the cyclic treatment being selected from a hydration/dehydration cyclic treatment, a thermal cyclic treatment, or combinations thereof,
    (b) the hydration/dehydration cyclic treatment comprising at least five cycles of:
    contacting in a hydration step the FCC catalyst with a hydrating gas stream selected from nitrogen, air, noble gases, water vapor, or mixtures thereof, at a relative humidity of 20 to 100% and a temperature of 50° F. to 400° F., thereby forming a hydrated solid; and
    contacting in a dehydration step the hydrated solid with a dehydrating gas stream comprising water at a relative humidity of less than 20% and a temperature of from 200° F. to 1600° F., thereby forming a dehydrated solid, wherein for each cycle, except the first cycle, the dehydrated solid is the FCC catalyst for the hydration step in the next cycle;

the thermal cyclic treatment comprising at least five cycles of:

heating the FCC catalyst to a heated temperature, thereby forming a heated FCC catalyst; and cooling the heated FCC catalyst to a cooled temperature, thereby forming a cooled FCC catalyst, wherein the difference between the heated temperature and the cooled temperature is at least 200° F., and where for each cycle, except the first cycle, the cooled porous solid is the FCC catalyst for the heating step in the next cycle; and (b) treating the cyclically-treated catalyst in a hydrothermal or redox deactivation process, thereby forming a deactivated FCC catalyst;

(c) comparing the matrix surface area of the deactivated catalyst to the target matrix surface area; and (d) changing the number cycles of step (a) to adjust the matrix surface area of the cyclically-treated catalyst.

39. A method for comparing a series of FCC catalysts comprising:

(a) deactivating a first FCC catalyst having a matrix surface area to simulate a target matrix surface area as in claim 38;

(b) deactivating at least one additional FCC catalyst with the procedure of step (a); and (c) determining at least one of the physical properties and yield performance of the first FCC catalyst and the at least one additional FCC catalyst.

40. A catalyst deactivated by the process of claim 1.

41. The process of claim 1 wherein the cyclic treatment is a hydration/dehydration cyclic treatment.

42. The process of claim 41 wherein each hydration/dehydration cycle is followed by a redox cyclic treatment.

* * * * *